April 21, 1953  J. L. GRATZMULLER  2,635,392
PRESSURE REDUCING VALVE DEVICE
Filed Dec. 29, 1945  6 Sheets-Sheet 1

Inventor
J. L. Gratzmuller

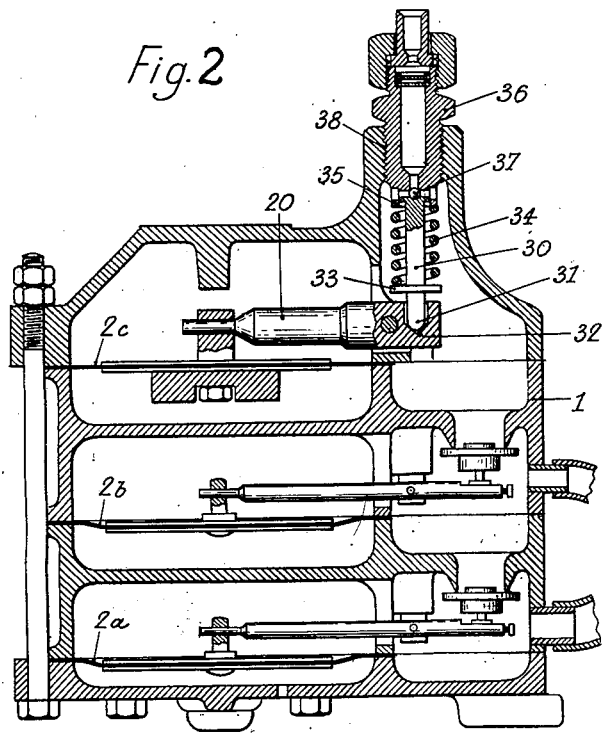
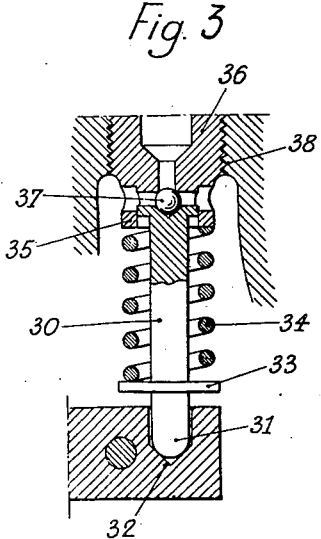
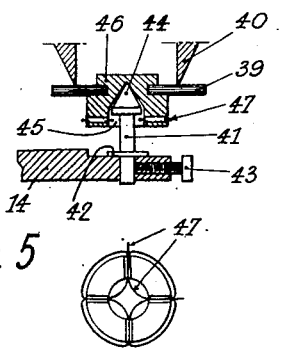
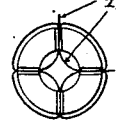

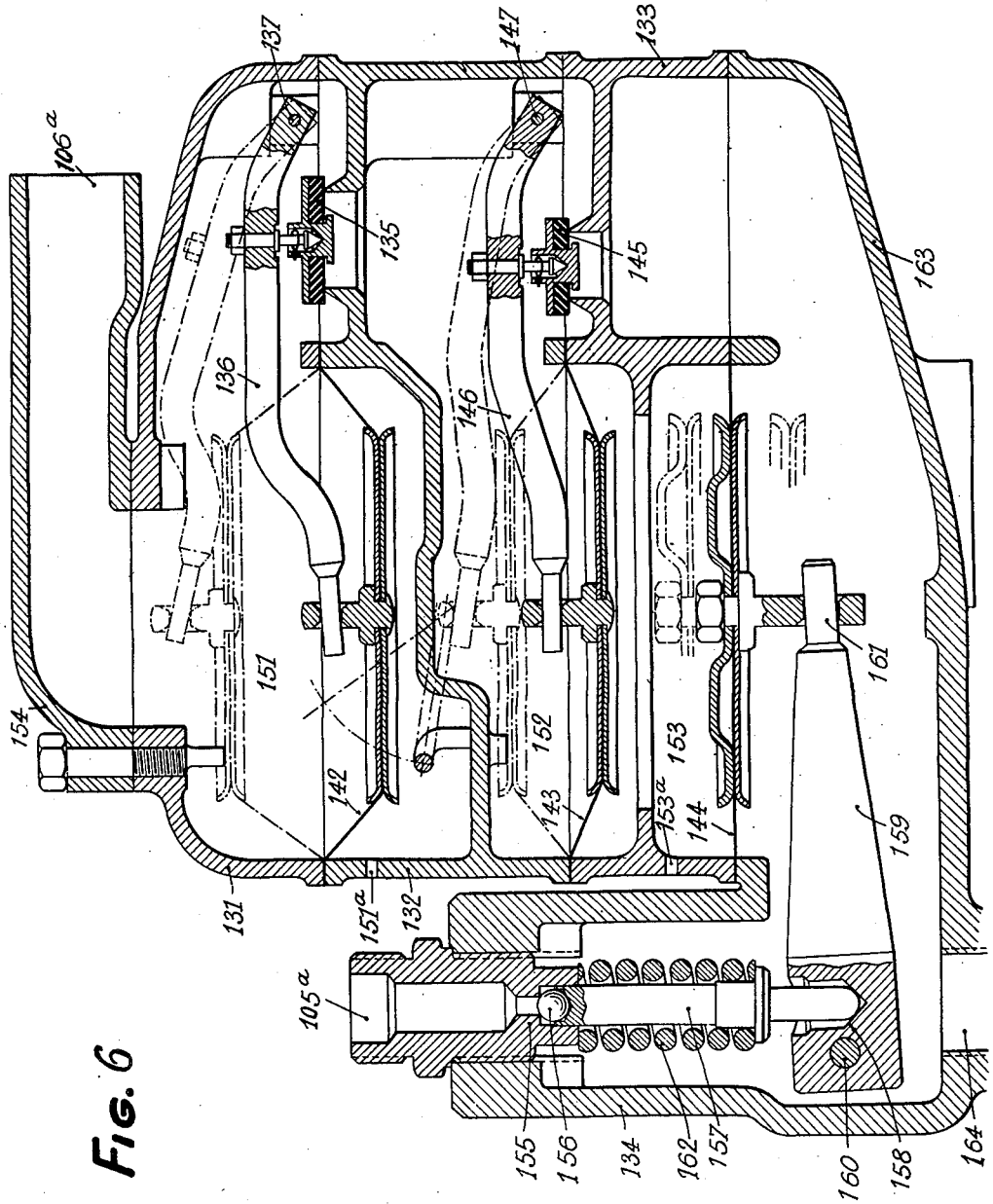

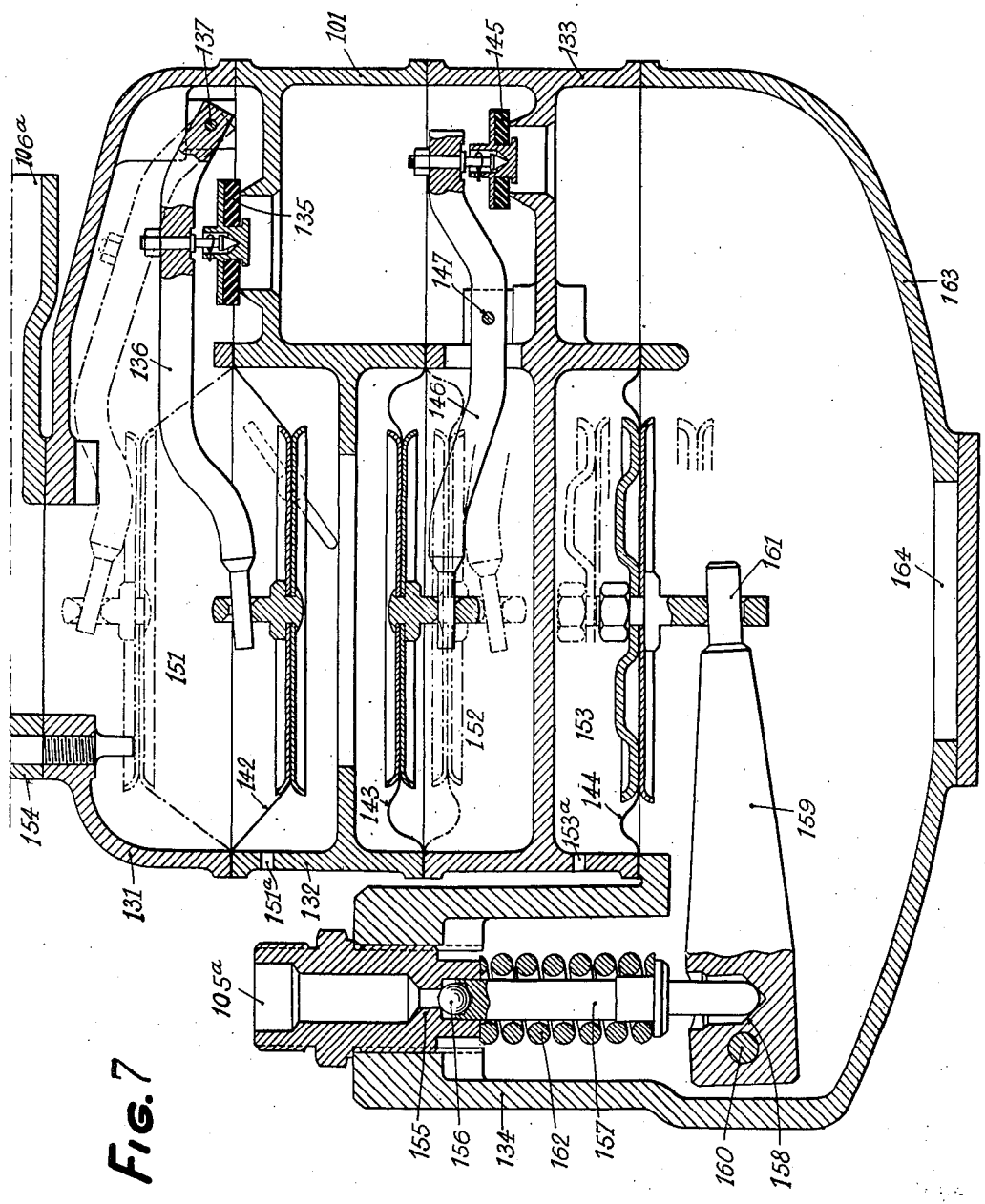

April 21, 1953 — J. L. GRATZMULLER — 2,635,392
PRESSURE REDUCING VALVE DEVICE
Filed Dec. 29, 1945 — 6 Sheets-Sheet 5

Inventor
J. L. Gratzmuller
By Mason K Downing Seibold
Attys.

April 21, 1953    J. L. GRATZMULLER    2,635,392
PRESSURE REDUCING VALVE DEVICE
Filed Dec. 29, 1945    6 Sheets-Sheet 6

Inventor
J. L. Gratzmuller
By Glascock Downing & ...
Attys.

Patented Apr. 21, 1953

2,635,392

UNITED STATES PATENT OFFICE 2,635,392

PRESSURE REDUCING VALVE DEVICE

Jean Louis Gratzmuller, Paris, France

Application December 29, 1945, Serial No. 637,965
In France May 4, 1943

Section 1, Public Law 690, August 8, 1946
Patent expires May 4, 1963

1 Claim. (Cl. 50—26)

The present invention relates to pressure reducing valve devices for the supply of gas at a given pressure from a source of gas at a relatively high pressure. The invention is more especially, although not exclusively concerned, among these devices, with these to be used for feeding an internal combustion engine with a gaseous fuel supplied from a high pressure reservoir, for instance a bottle containing town gas at a pressure ranging from 200 to 300 kgs.

In order to ensure a good working of the engine, the valve device in question must be capable of supplying gas at the desired reduced pressure as soon as there exists a small depression (for instance 5 mm. of water) at the intake of the engine, and of cutting off this gas supply as soon as this depression ceases.

In pressure reducing devices of this kind, a perfect response of the flow to slight variations of the pressure at the output is rarely obtained. Furthermore leakage generally occurs past the valve elements provided between chambers at different pressures.

The object of the present invention is to obviate these drawbacks.

According to an essential feature of my invention, the pressure reducing device includes at least two stages, in the first of which the gas from the high pressure source is allowed to expand to a pressure relatively little above the desired final pressure, whereas in the last stage the gas is caused to expand exactly to this desired output pressure, the valve means of this last stage being operated by the opposed actions of gravity, tending to close said valve means, and pressure, tending to open said means, exclusive of the action of any spring.

According to another feature of my invention, in a pressure reducing device including at least two stages of expansion, the valve means of the first stage include a valve member and a valve seat arranged to contact each other over a relatively small area and to be deformed one by the other, so as to ensure a practically perfect fluid-tight fit, under the effect of over-pressure in said first stage caused by a leak past said valve means, whereby the deformation just necessary to stop said leak is automatically produced when needed, and only when needed.

Other features of my invention will result from the following detailed description of specific embodiments thereof, given by way of example with reference to the accompanying drawings, in which:

Fig. 2 is a similar view of a modification;

Fig. 3 is a detail view on an enlarged scale corresponding to Fig. 2;

Figs. 4 and 5 are other detail views, also corresponding to Fig. 2;

Figs. 6, 7 and 8 are sectional views of two other embodiments of the pressure reducing device according to my invention;

Figure 1:
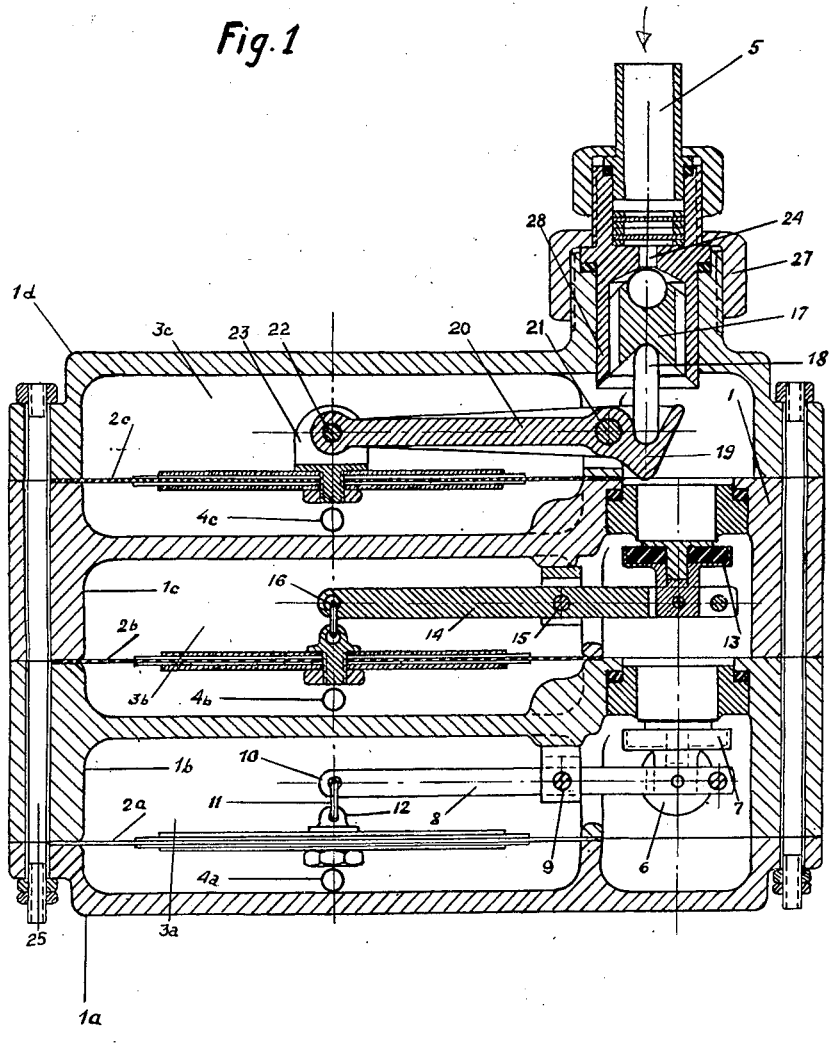
Fig. 1 is a diagrammatic sectional view of a first embodiment of a device according to my invention.

Referring to the drawings, and especially to Fig. 1, reference character 1 designates the body of the pressure reducing device constituted, for instance, by several parts such as 1a, 1b, 1c and 1d superposed to one another and assembled by bolts 25. Three diaphragms 2a, 2b, 2c are mounted respectively in chambers 3a, 3b and 3c. The portion of each of these chambers located below the diaphragm communicates with the atmosphere through orifices 4a, 4b and 4c respectively. The gas under pressure flows in through conduit 5. The engine intake is connected with chamber 3a through an orifice 6. The communication of chamber 3a with chamber 3b is controlled by means of a check valve 7 mounted on the end of a lever 8 pivoted at 9. The end 10 of this lever is connected with the central part of diaphragm 2a, for instance, through a link 11, pivoted, on the one hand, to the end 10 of lever 8 and, on the other hand, to a piece 12 carried by the central part of the diaphragm.

Check valve 13, which controls the communication between chamber 3b and chamber 3c, is similarly mounted on the end of a lever 14 pivoting about at 15. The end 16 of this lever is connected to the central portion of diaphragm 2b, in the same manner as above set forth concerning chamber 3a.

The gas under pressure enters chamber 3c through a passage controlled by a valve which, in the example shown, is constituted by a ball carried by a piece 17. This valve, when pushed off from its seat by the gas under pressure, acts, through the intermediate of piece 18 on the curved end 19 of a lever 20 pivoted at 21. The other end 22 of lever 20 carries a piece 23 carried by the central portion of diaphragm 2c.

In this embodiment, the connection between valve piece 17 and the end 19 of lever 20 is ensured by a rod 18 having rounded ends and freely interposed between these two pieces. The lower face of piece 17 and the end 19 of lever 20 are of rounded shape to accommodate rod 18 so that if said valve piece 17 and said end of lever 20 are moved away from each other, rod 18 is inclined but cannot escape from between said parts 17 and 20. When these parts again move toward each other, the rod automatically returns into position. This arrangement is extremely simple and strong and cannot give rise to any jamming or getting out of order. Furthermore, it simplifies the taking to pieces. As a matter of fact, it suffices to unscrew nut 27 and to remove pieces 24 and 17. To reassemble the parts, pieces 17 and 24 are inserted in their housings, and piece 18 automatically comes back into position.

The operation of the device is as follows:

When the engine is running, a suction is transmitted to chamber 3a above membrane 2a. As the lower face of the diaphragm is subjected to atmospheric pressure, and as this surface is relatively large, a very small suction is sufficient to cause the central portion of the diaphragm to rise and lever 8 to pivot about axis 9, valve 7 opens and chamber 3a is in communication with chamber 3b.

As a consequence, lever 14 pivots about point 15, valve 13 opens and the pressure existing in chamber 3b is transmitted to chamber 3c. In a likewise manner lever 20 then pivots about its axis 21 and valve 17 opens the communication with the source of gas under pressure. This gas enters chamber 3c and immediately causes the pressure to rise in this chamber. Being given, on the one hand, the ratio of the lever arms of lever 20 (this ratio being for instance of about 1 to 10) and, on the other hand, the ratio of the surface areas on which are respectively exerted the pressures of the compressed gas (section of passage 24) and of the atmosphere (area of diaphragm 2c), a pressure in chamber 3c averaging 1 kg. per sq. cm. above atmospheric pressure ensures the closing of valve 17 with a force averaging one ton per sq. cm.

Under these conditions, any leakage from conduit 5 into chamber 3c, past valve 17, is avoided, although the valve member, constituted by a ball, contacts its seat over a relatively small area, practically along the ridge of the outlet end of passage 24. As a matter of fact, that of these two elements (the ball and its seat) which is made of a metal harder than the other deforms the other, under the effect of the high force above mentioned, and thus automatically produces a practically perfect contact between said elements. Furthermore a leakage is eliminated by this deformation; this force will not be again applied so that there is no possibility of the elements in question being injured by repeated deformations.

The increased pressure in chamber 3c passes into chamber 3b, but valve 13 closes as soon as a given pressure is reached in 3b; this pressure is substantially lower than the pressure in chamber 3c, in view of the ratio of the respective arms of lever 14 and of the ratio of the surface areas of valve 13 and diaphragm 2b. Supposing, for instance, that the maximum pressure in chamber 3c averages 1 kg. per sq. cm. above atmospheric pressure, the pressure at which valve 13 closes will be about 20 gr. per sq. cm. above atmospheric pressure.

The gas under pressure of chamber 3b passes into chamber 3a until the suction in this last mentioned chamber is reduced to a given degree. Then valve 7 closes, it again opens only when the suction reaches the given value (for instance ½ gr. per sq. cm.).

It will be noted that in view of the presence of at least two successive expansion chambers, the working of check valve 17, which controls the feed of compressed gas from the high pressure source, can always take place irrespective of variations (and, in particular, drops) of the pressure of said source. Sensitiveness of operation is ensured by the last stage.

Now, it is an important characteristic of my apparatus that this last stage (chamber 3a, diaphragm 2a, lever 8, valve 7) includes no spring and requires no adjustment, therefore practically cannot get out of order.

The construction of my apparatus is extremely simple, since parts 1a, 1b, 1c, 1d are superposed and assembled together in a very simple manner; for instance by means of bolts, such as 25, interconnecting all these parts.

In the embodiment of Figs. 2 to 5 inclusive, the valve of the first stage is constituted, in the example shown, by a rod 30 terminated, at its lower end, by a semi-spherical portion 31 engaging in a hollow 32 provided at the end of lever 20. This rod 30 includes a shoulder 33 on which bears the lower end of a spring 34 the upper end of which bears against the lower edge 35 of a threaded piece 36 screwed in the upper wall of the pressure reducing device. The closing of the check valve is ensured by a ball 37. With this arrangement, sticking is made impossible in view, on the one hand, of the swivel mounting of the lower end 31 of rod 30 and, on the other hand, of the action of spring 34. The presence of this spring further ensures a smoother operation of the first stage of the apparatus. Assembly of the parts is very simple, obtained by screwing of piece 36 in the threaded hole 38 provided in the upper portion of the apparatus casing.

Another feature of this embodiment is the particular construction of the other valves of the device. These valves are constituted by an annular part of the plastic material 39 applied against a sharp edge 40 acting as a seat, part 39 being carried by the end of a lever such as 14, through the intermediate of a rod 41 engaged in the end of lever 14 in a position determined by a flange 42 and secured by a screw 43. Rod 41 has a pointed end 44, engaged in a housing 45 of a piece 46 in which ring 39 is inserted. The provision of conical part 44 and of housing 45 ensures a swivel mounting which prevents any sticking. On the other hand, in order to ensure the opening of the valve, conical piece 44 must be able to pull piece 46 when the right hand end of lever 14 is moving downwardly. This can be obtained in practice in a very simple manner by means of a wire 47 passed in holes provided at the lower part of piece 46 so that, when rod 41 moves down, the lower edge of conical part 44 bears against this wire 47 and pulls piece 46 downwardly, thus moving annular member 39 away from edge 40.

In the embodiment of Fig. 6, the body of the apparatus is made of parts 131, 132, 133, 134. 142, 143 and 144 are three diaphragms respectively mounted in chambers 151, 152 and 153. The portion of each of these chambers located on one of the sides of the diaphragm communicates with the atmosphere through orifices 151a for the first chamber and 153a for the two other chambers. Gas under pressure is fed through conduit 105a. The intake of the engine is connected to chamber 151 through an orifice 106a provided in a conduit 154 fixed by means of bolts upon the upper element 131 of the body of the pressure relief device. Communication between chamber 151 and chamber 152 is controlled by a valve 135 mounted on a lever 136 pivoted at 137 and connected at its free end with diaphragm 142. In turn, chamber 152 communicates with chamber 153 through a valve 145 mounted on one of the ends of a lever 146 pivoted at 147 to the body of the pressure relief device and connected, at its other end, to diaphragm 143. Gas under pressure enters chamber 153 by flowing past a valve 155 constituted by a ball 156 placed in a conical seat formed in the end of a rod 157 the rounded lower end of which is housed in a seat 158 provided in the end of a lever 159 pivoted at 160 to the body of the cock and the end 161 of which is connected to the center of diaphragm 144; a spring 162 tends to open the valve, the closing of which is ensured by diaphragm 144 acting with an important leverage on the end of rod 157.

The operation of this apparatus is analogous to that above described, the gas undergoing successive expansions, first in chamber 153, then in chamber 152, and finally in chamber 151, before it is fed to the engine. This pressure reducing device delivers gas under the effect of a suction from the engine, as above explained.

The present embodiment is remarkable in that chamber 153 into which the compressed gas is fed is located at the lower part of the apparatus, the bottom 163 of this chamber being adapted to receive the gums present in the gas, which gums may subsequently be evacuated through an orifice 164 closed in any suitable manner.

Fig. 7 shows a modification in the arrangement of the bottom of the apparatus and of the orifice for the discharge of the gums on the one hand.

In this case, in order to facilitate the removal of the gums, orifice 164 is located at the centre of bottom 163 and is of larger section.

On the other hand, in this embodiment of Fig. 7, diaphragm 143 is located above the end of lever 146, so that, in order to open valve 145, it moves in a downward direction. Owing to this arrangement, the weight of the diaphragm, with the parts fixed thereon, tends to open the valve, which produces in chamber 152 a pressure higher than atmospheric pressure. Thus, valve 145 automatically opens as soon as valve 138 itself opens, without necessity of transmitting the suction to chamber 152.

Figure 8:
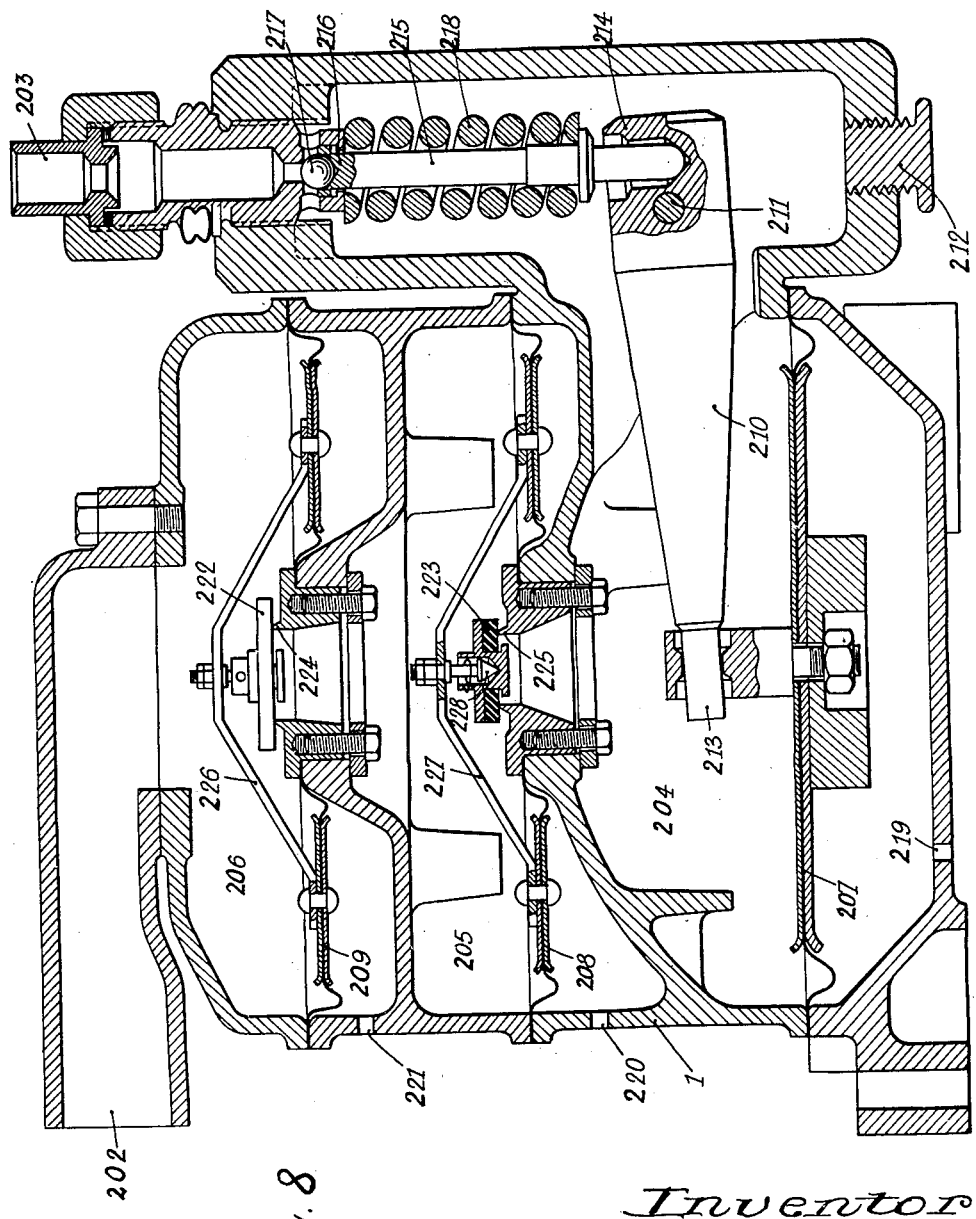

In the embodiment of Fig. 8, 1 is the body of the pressure reducing device, 202 the outlet of the gases towards the intake pipe of the engine and 203 the inlet for the gases under pressure. The body 1 of the pressure relief device is separated into three chambers, respectively 204, 205 and 206. Each of these chambers is separated into two portions by a diaphragm, respectively 207, 208 and 209. 212 is a discharge orifice for the gums that may accumulate at the bottom of the apparatus under the compressed gas inlet valve. The valve that controls the inflow of compressed gas into chamber 204 is controlled by a lever 210 pivoted about an axis 211; the end 213 of this lever 210 is pivoted to diaphragm 207, whereas its end 214 is provided with a conical seat in which is engaged the rounded end of the rod 215 of the valve. The upper end of this rod is provided with a conical seat 216 in which is housed a ball 217 controlling the inflow of the gases. A spring 218 tends to open the valve. The portions of chambers 204, 205 and 206 located below the diaphragm communicate with the atmosphere through orifices, respectively 219, 220 and 221. Valves 222 and 223 are arranged in such manner as to avoid any risk of being stuck by accumulation of gum, owing to the fact that they are each constituted by a disk which merely rests, under the action of its own weight, upon a sharp ridge, respectively 224 and 225. On the other hand, the section of valve 222 is greater than that of valve 223, because the gases that flow through valve 222 are under a pressure lower than the gases that flow through valve 223. Each of the valves 222 and 223 is mounted upon its support, respectively 226 and 227, through an articulation such as 228 which permits self adjustment of the valve upon its seat.

Figure 9:
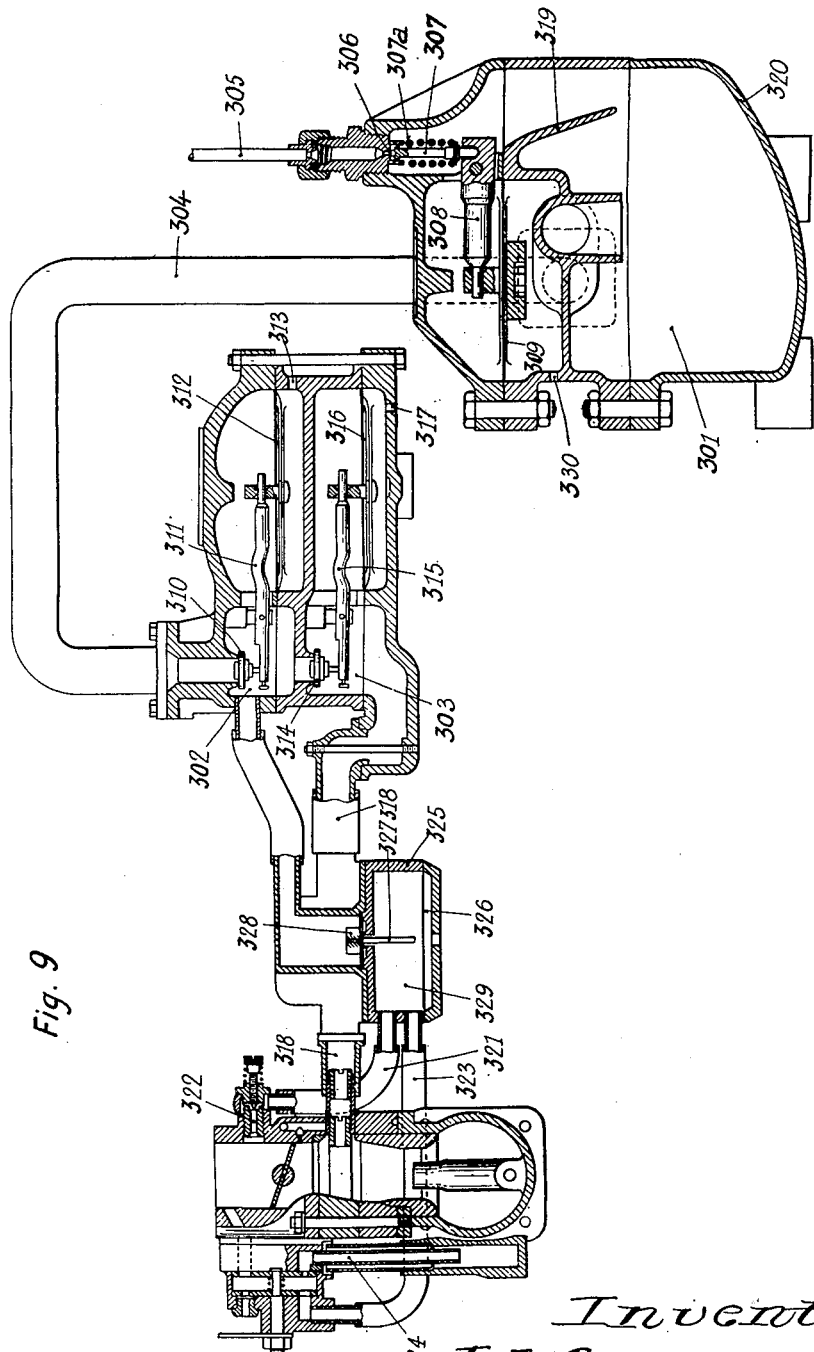
Fig. 9 is a diagrammatical view of a feed system for an internal combustion engine.

In the embodiment of Fig. 9, the pressure reducing device includes three stages, the first stage, 301, being separated from the two next stages, 302 and 303, with which it communicates through a conduit 304.

In its principle of operation, this pressure reducing device is of the same type as above described.

The first stage 301 includes an expansion chamber in which the gas coming from conduit 305 is admitted through a valve 306 the rod 307 of which is mounted on one end of a lever 308 pivoted to the frame of the apparatus, the other end of said lever being fixed to a diaphragm 309. The upper face of this diaphragm is subjected to the pressure existing in chamber 301, and the other to the atmospheric pressure owing to an aperture 330 provided in the wall of the frame.

The gas issuing from chamber 301 passes through pipe 304 into the second expansion chamber 302. It is admitted thereinto by the opening of a valve 310 carried at the end of a lever 311, the other end of which is fixed to a membrane 312, one of the faces thereof being subjected to the atmospheric pressure owing to the provision of an orifice 313 connecting with the atmosphere the chamber located under diaphragm 312.

In a likewise manner, gas can pass from chamber 302 into chamber 303 by pushing away from its seat a valve 314 carried by a lever 315 subjected to the action of a diaphragm 316, the upper face of this diaphragm being subjected to the pressure existing in chamber 303 and the under face to the atmospheric pressure, owing to the provision of an orifice 317.

The gas issuing from chamber 303 is then admitted into the carburetter through conduit 318.

The adjustment of the first expansion stage (choice of the force of spring 307a and of the respective arms of lever 308) is established in such manner that the gas coming from high pressure conduit 305 is expanded in chamber 301 to a pressure close to the utilization pressure. At the outlet of this stage, it therefore remains to perform only a small expansion of this gas in stages 302 and 303 for bringing it to the desired final pressure. Consequently, the precision of expansion in stage 301 needs not be very high, but it must be in stages 302 and 303. On the other hand, due to this considerable expansion taking place in the first stage 301, the gas is very much cooled, which causes condensation of the impurities and in particular of the gums. If, consequently, these gums are to produce detrimental effect, for instance by tending to stick the valve on its seat, these effects are localized to the first stage of the pressure relief device. Due to the characteristics above mentioned, these effects have no serious consequences. This is due to the fact that, on the one hand, the high pressure of the gas, flowing in at 305 gives the certainty that, in any occurrence, the valve will be pushed away from its seat, even if it is slightly stuck thereon, on the other hand, the slight disturbance that may result from such a sticking will involve no substantial drawback, since, as just above stated, the precision of operation of the first stage needs not be very high. Finally, owing to the dimensions and the form given to chamber 301 which, in particular, includes a baffle 319 intended to compel the gases to flow along the walls of vessel 320, a practically total deposit of the impurities contained in the gas in the form of a mist is obtained in this stage.

It follows that, in the next stages, where the condensation of impurities, and in particular of gums, might have very serious consequences, no trouble can occur since the gases have already been purified.

In order to permit of easily cleaning chamber 301 from the impurities that deposit therein, the lower portion of this chamber is located at an easily accessible place. Therefore, it will suffice to remove this portion 320 at relatively remote time intervals, for instance every month, for detaching from the walls thereof the products deposited thereon.

According to known arrangements in plants of the type to which the invention relates, the gases for feeding the engine under idling conditions, or the gases which ensure the starting, or both, are supplied by a separate pressure reducing device, which, in particular, may be mounted on one of the intermediate stages of the main pressure reducing device. In the embodiment of the present invention shown by Fig. 9, I have illustrated an arrangement of this kind. The gases intended to feed the engine under idling conditions, which are fed through conduit 321 to the idling jet 322, same as the gases intended for the starting of the engine, which are fed through conduit 323 to starter 324, are supplied by a distinct pressure reducing device element, itself fed by the second stage of the main pressure reducing device. This auxiliary pressure reducing device 325 includes a diaphragm 326 subjected, at its lower part, to atmospheric pressure and which acts upon the stem 327 of a valve 328 ensuring communication between the chamber 302 of the main pressure reducing device and the chamber 329 of the auxiliary pressure reducing device. It can therefore be considered that the feed of the idling jet and of the starter is ensured by a three stage pressure reducing device consituted by the combination of stages 301 and 302 of the main pressure reducing device and of the element 325 which has just been described. The operation of element 325 may also be of high precision for complying with the requirements of practice, but the combination constituted by stages 301, 302 and 325 has all the advantages which have been above described concerning the main pressure reducing device (stages 301, 302 and 303) since the gas passing through stage 302 has already been freed from its gums in stage 301 and, consequently, the working of element 325 does not risk being troubled by condensation of gums or other analogous products.

It should be noted that the device according to the invention, not only ensures a suitable working of the pressure reducing device, but also prevents the passage of impurities to the carburetter, a drawback which occurred in the case of prior devices.

On the other hand, it is known that, among the impurities contained in the gas, there may exist liquid substances which risk, when driven by the gas, to arrive, through the pressure reducing device, to the carburetter and to exert a detrimental action upon the working of the engine. In this case, it will be advisable to stop these liquid impurities through any suitable means before the gas enters the pressure reducing device, for instance by fitting in the gas feed conduit, on the upstream side of the pressure reducing device, a decantation device of any suitable type. This device will be preferably provided with a drain cock permitting evacuation of the impurities.

What I claim is:

In a pressure reducing device, the combination of an expansion chamber having an inlet passage; a lever pivoted in said chamber and having a socket in its end disposed to receive the end of a rod disposed substantially perpendicular to its axis; means for rocking said lever; a rod having a hemi-spherical head on one end and a circular peripheral flange on its other end, said head being received in said socket so that said rod and its said peripheral flange extend toward said inlet passage; a guide ring mounted on the wall of said chamber adjacent said inlet passage, said flange being slidably disposed in said ring; said inlet passage having a circular valve seat; and a ball-valve member interposed between said seat and the peripherally flanged end of said rod, said rod being biased axially away from said ring toward said lever.

JEAN LOUIS GRATZMULLER.

References Cited in the file of this patent

UNITED STATES PATENTS

| Number | Name | Date |
|---|---|---|
| 573,213 | Fuller | Dec. 15, 1896 |
| 868,599 | Coleman | Oct. 15, 1907 |
| 1,226,040 | Whitbeck | May 15, 1917 |
| 1,626,581 | Gaunt | Apr. 26, 1927 |
| 1,764,835 | Geer | June 17, 1930 |
| 1,948,027 | Deming | Feb. 20, 1934 |
| 2,057,133 | Bryce | Oct. 13, 1936 |
| 2,161,531 | Rylsky | June 6, 1939 |
| 2,258,485 | Everson | Oct. 17, 1941 |

FOREIGN PATENTS

| Number | Country | Date |
|---|---|---|
| 823,406 | France | of 1938 |